US006791812B1

(12) United States Patent
Määttä

(10) Patent No.: US 6,791,812 B1
(45) Date of Patent: Sep. 14, 2004

(54) SURGE PROTECTOR

(75) Inventor: Hannu Määttä, Oulu (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/673,928

(22) PCT Filed: Apr. 26, 1999

(86) PCT No.: PCT/FI99/00336

§ 371 (c)(1),
(2), (4) Date: Dec. 13, 2000

(87) PCT Pub. No.: WO99/56291

PCT Pub. Date: Nov. 4, 1999

(30) Foreign Application Priority Data

Apr. 24, 1998 (FI) ................................................ 980905

(51) Int. Cl.[7] .................................................. H02H 9/00

(52) U.S. Cl. .......................... 361/118; 361/58; 361/103

(58) Field of Search ................................ 361/118, 103, 361/56, 58, 104

(56) References Cited

U.S. PATENT DOCUMENTS

| | | | | |
|---|---|---|---|---|
| 4,794,367 A | 12/1988 | Ashe et al. | ................. | 338/308 |
| 4,999,731 A | 3/1991 | Bender et al. | .............. | 361/119 |
| 5,057,964 A | 10/1991 | Bender et al. | .............. | 361/118 |

FOREIGN PATENT DOCUMENTS

| | | | | |
|---|---|---|---|---|
| EP | 0 271 993 A2 | 11/1987 | ............ | H01C/7/12 |
| EP | 0 795 880 A3 | 3/1997 | ......... | H01C/17/242 |

*Primary Examiner*—Stephen W Jackson
(74) *Attorney, Agent, or Firm*—Pillsbury Winthrop LLP

(57) ABSTRACT

Surge protector which includes a film pattern (2) formed on a suitable substrate (1) is characterized in that the film pattern (2) essentially consists of narrow lines (2*a*, 2*b*, 2*c*) which extend parallel and adjacent to each other and are electrically in parallel relationship to each other, and bridges (11–24) between the lines. Advantageously, there are three parallel lines. The resistance of the film pattern (2) is trimmed advantageously by cutting (T5, T6, T7, T8, T9, T10) one of the lines (2*c*) between successive bridges.

3 Claims, 2 Drawing Sheets

SURGE PROTECTOR

FIELD OF THE INVENTION

The invention is related to surge protectors manufactured by film techniques and provided for warding off and withstanding high instantaneous overvoltage pulses.

One way of manufacturing this kind of surge protectors is to form a serpentine shaped or technically equivalent film pattern of material with suitable resistance on a suitable substrate with good thermal conductivity. As the high frequency current of a overvoltage pulse is concentrated in the edges of the film, a serpentine shaped or technically equivalent narrow film line causes that the current and at the same time the heating up are distributed relatively evenly over a large area on the substrate.

BACKGROUND OF THE INVENTION

Today, a preferred manufacturing technique of this type of surge protection resistors is thick film technology in which the substrate is a ceramic substrate and the film is made of material specifically manufactured for this kind of applications. One manufacturer of this kind of materials is DuPont Electronic Materials having thick film material series 7300 and 7400 for these purposes. These materials are suitable compositions of, e. g., silver, palladium and glass material which provide a low temperature coefficient of resistance, high enough trimming accuracy and good stability against the effects of overvoltage pulses. The resistivity of a resistor film is typically from 100 to 1000 mΩ/□. The resistor film may be further protected by a suitable glazing or equivalent which reduces oxidization and change of properties caused thereby as the effect of an overvoltage pulse is heating up the resistor and the substrate.

Surge protection components manufactured by thick film technology include often several protection resistors on one substrate, either adjacent to each other on the same side of the substrate or as printed on the both sides of the substrate. They are widely used in telecommunication equipment, and, e. g., for protecting telephone lines each conductor of a line needs its own protection resistor. An absolute tolerance of 5% and a relative tolerance of 1% are normal requirements for protection resistors. Therefore the resistors are to be trimmed. For trimming the pattern, serpentine, spiral or equivalent, is designed to included a suitable amount of bridges so as to lengthen the line by cutting bridges until the desired value is reached. Because only a tolerance of ±30% may be obtained without trimming, the possible need for wide range trimming must be taken into account. That is to say, there must be enough bridges. On the other hand, if the need for trimming is small, the most of the bridges are not cut and the current of the overvoltage pulse is flowing through the bridges. Then, there exist a lot of parts in the film pattern through which the current is not flowing. This means that cold spots are left on the substrate, and the failure risk of the resistor component is increased.

Several solutions are developed to overcome this problem, a widely used solution being demonstrated by the example of FIGS. 1 and 2. A narrow film line 2, which forms a protection resistors, makes a serpentine shaped pattern on the substrate I between contact areas 3 and 4. The width of the line may be 0.5 to 1 mm, for example. At several places a line coming to and a line leaving a turning point 6*a* . . . 6*h* are connected by a bridge 5*a* . . . 5*h*, respectively, and at a place close to the contact area 4 there is a special loop 6*i* of line 2. The resistance of the serpentine pattern is trimmed by appropriately cutting bridges, as is indicated by the arrow T at the bridge 5*a* in FIG. 1 and by trimming points T1, T2, T3 and T4 indicated by broken line in FIG. 2. As a bridge is cut, the resistor formed by the serpentine is lengthened and the resistance thereof is increased. In the example of FIG. 2, scarcely anything of the current of an overvoltage pulse flows through the loops 6*b*, 6*c*, 6*e* and 6*h*, and so these places remain colder than the circumference thereof during the influence of a pulse.

The solution of U.S. Pat. No. 4,999,731 is, in principle, the same as the solution of FIGS. 1 and 2. Therein, the trimming points are placed as close as possible to the edges of the substrate and the serpentine pattern by means of which the temperature distribution is made even especially in the central area of the substrate.

On the other hand, U.S. Pat. No. 5,057,964 presents a solution based on a spiral pattern. The trimming is made by cutting only bridges in the central area of the spiral. In this case the temperature distribution is even in the peripheral area of the pattern, but the central parts of the spirals remain the colder the less the resistors are trimmed.

SUMMARY OF THE INVENTION

An object of the invention is to present a solution by means of which the distribution of the current is made as even as possible both without any trimming at all and with various trimmings.

For realizing this and other objects of the invention the surge protector in accordance with the invention is characterized by the features defined by claim 1 of the appended claims. Other claims define various embodiments of the invention.

The solution in accordance with the invention is characterized in that the film pattern essentially consists of narrow lines, which extend parallel and adjacent to each other, and bridges between the lines. Advantageously, there are three parallel lines, and for trimming the resistance of the film pattern only one of the lines is cut off between successive bridges. So, for the high frequency current to flow, there are still two film lines and four edges thereof in which the flow of the current is concentrated. As the lines are close to each other, only a relatively narrow band is left at each trimming point in which the current does not flow and heat up the substrate during the incluence of a pulse. The trimming points may be placed in such a way that active lines are located at each side thereof, whereby the heat is distributed in the thermally conducting substrate quite well also to the area of the line cut off by trimming.

BRIEF DESCRIPTION OF THE DRAWINGS

The invention and some embodiments thereof are explained in more detail in the following with reference to the attached drawings, wherein.

DETAILED DESCRIPTION OF A PREFERRED EMBODIMENT

Figure 1:
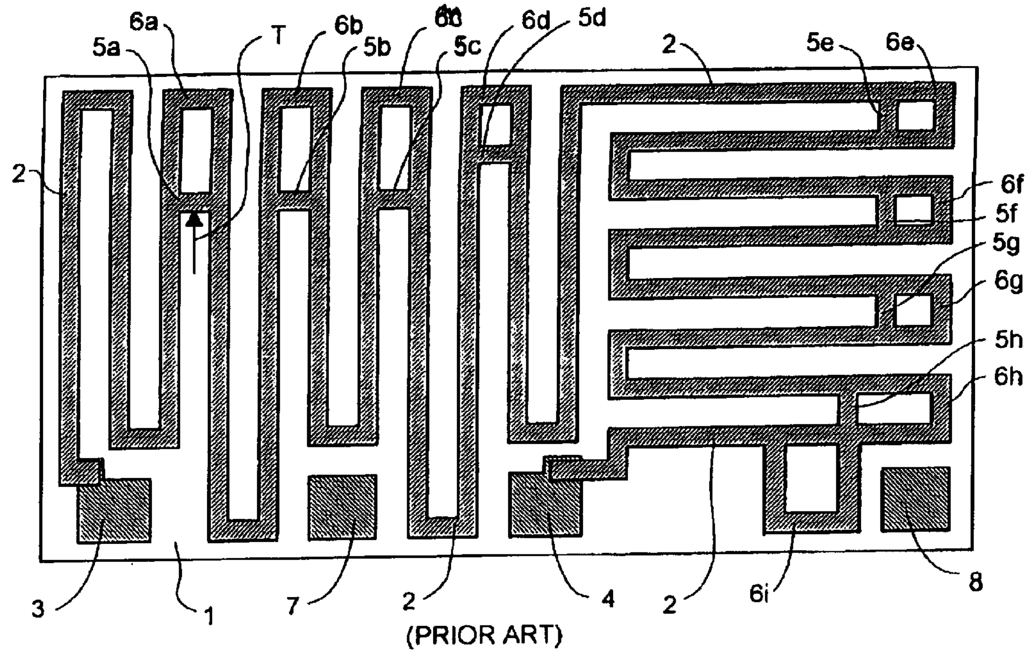
(PRIOR ART) Fig. 1
FIGS. 1 and 2 a prior art realization of a surge protector.
Figure 2:
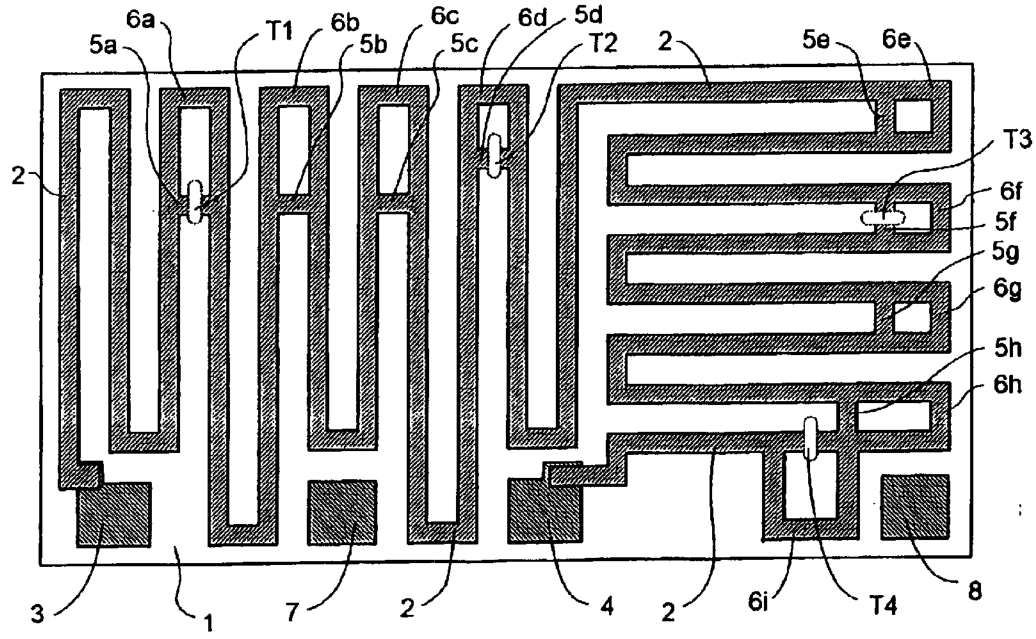
(PRIOR ART) Fig. 2

The prior art solution was considered above in the introductory part of the specification with reference to FIGS. 1 and 2.

Figure 3:
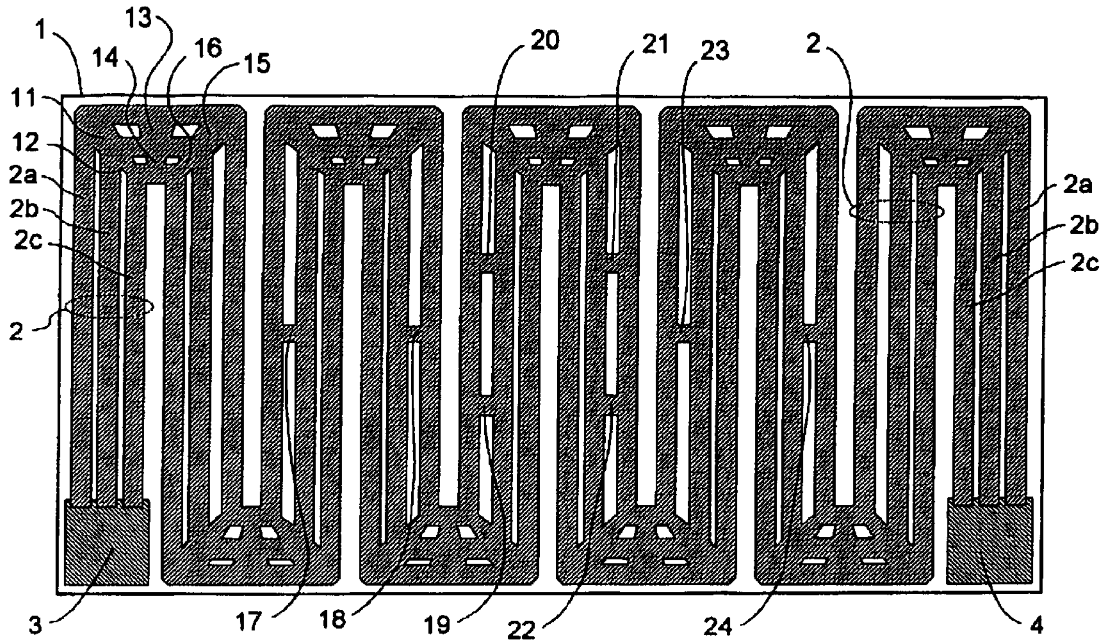
FIGS. 3 and 4 present schematically an exemplary realization of a surge protector in accordance with the invention.

In FIG. 3, on a substrate 1 between contact areas 3 and 4 there is a film pattern including three parallel film lines 2*a*, 2*b*, 2*c* and bridges 11, 12, . . . , 23, 24 therebetween, the pattern forming a surge protector resistor. The film pattern forms a serpentine which covers uniformly the area provided for the resistor. The contact areas 3 and 4 are made of conventional conductor material with good solderability while the film pattern is made of material meant for this kind of application, e.g., Dupont 7300 series material. The width of the lines may be of the order of 0.5 mm, for example. For making the distribution of the current even, the lines are advantageously manufactured in such a way that they have essentially the same resistance between the contact areas 3 and 4. Also, advantageously, the bridges at the turning areas of the serpentine are made so that the resistance of each line within the turning area is essentially the same. The current of a pulse is then distributed evenly also within the turning area. In the figures, therefore, the bridges 11, 12; 13, 14; 15, 16 and the other similar bridges within the turning areas of the serpentine are widening towards the edge of the substrate. The trimming is here meant to be made by cutting off line 2*a* at suitable points. Other bridges 17, 18, 19, 20, 21, 22, 23, 24 are therefore only between lines 2*a* and 2*b*. Film lines 2*b* and 2*c* are positioned quite close to each other while line 2*a* is a little greater distance from line 2*b* for making the trimming easier.

Figure 4:
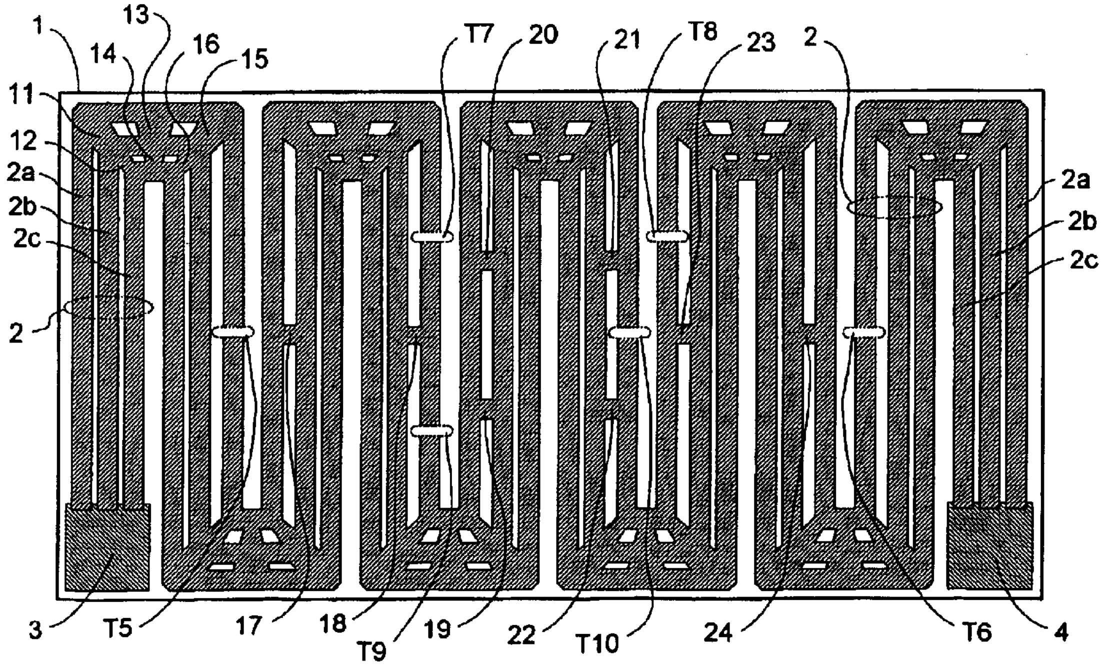

FIG. 4 presents an example of trimming the film pattern. In this case, the resistance within the desired tolerances is obtained by cutting off line 2*a* at points T5, T6, T7, T8, T9, and T10.

As stated above, the film pattern forming the resistor is normally covered by a glazing or other suitable protective coating which improves the properties of the protection resistor, e. g. reduces the change of the resistance value caused by a pulse. The trimming, normally laser trimming, is made through the protective coating. Leads are attached by soldering to the contact areas for connection to a printed circuit board, for example, and a surge protector in a form of a conventional SIL or DIL type hybrid circuit is obtained. p Here, only one protection resistor covering the whole area of substrate 1 is presented schematically, but there are often several protection resistors and may be also some other resistors and sometimes other electronic components placed on the same side or on the both sides of a substrate.

There may be also more than three parallel film lines, but for example in the sepentine embodiment the number three of lines is advantageous. The widths of the lines may differ from each other to some extent, and also the width of each line may vary within certain limits. Also the positioning of the bridges and trimming points may vary widely.

Serpentine pattern is an advantageous way of realizing the invention but, in principle, also a spiral type realization, which is used in similar protection resistor applications, is possible.

The surge protector of the invention may also be accomplished with other suitable technology than thick film technology which, however, is obviously very advantageous way of realizing the invention.

The invention may vary within the scope of the appended claims.

What is claimed is:

1. Surge protector which includes a serpentine or technically equivalent film pattern formed on a suitable substrate, wherein the film pattern comprises:

a plurality of narrow lines which extend parallel and close to each other and are electrically in parallel relationship to each other, and bridges between the lines; for making a high frequency current of a pulse concentrating in edges of the film lines to be distributed evenly over the substrate covered by the film pattern by cutting off one of the narrow lines between two successive bridges so that a relatively narrow band close to active lines is left without current thereby maintaining substantially even distribution of the current.

2. Surge protector of claim 1, wherein the number of parallel narrow lines is three.

3. Surge protector of claim 1, wherein the film pattern is formed between two points so that a length and resistance of each parallel narrow line between said points are essentially the same.

* * * * *